March 4, 1924.   1,485,960
B. J. CHAPMAN
METHOD OF AND APPARATUS FOR DETERMINING THE LOCATION OF THE PISTON
WITHIN A CYLINDER OF AN INTERNAL COMBUSTION ENGINE
Filed May 7, 1923
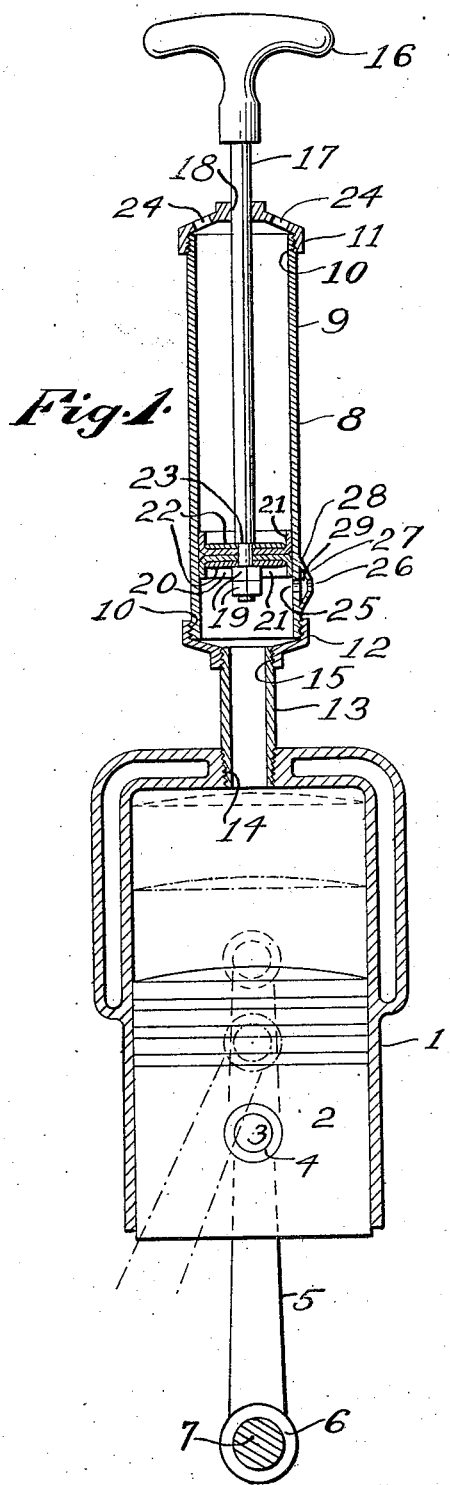
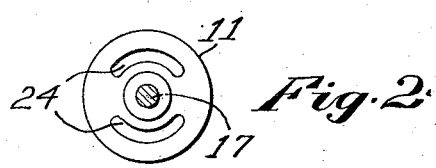
Fig. 2.
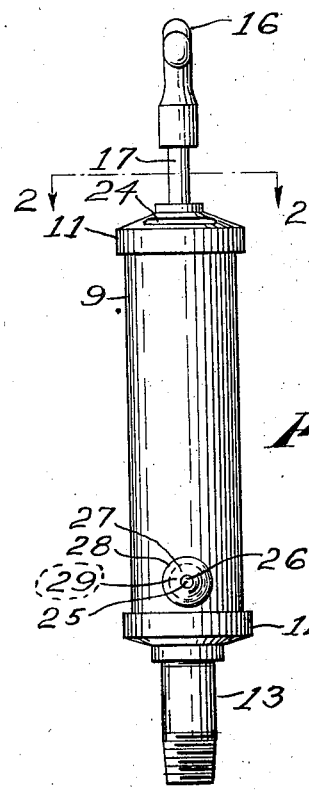
Fig. 3.
Inventor:
Byron J. Chapman,
By Hugh W. Wagner,
Attorney.

Patented Mar. 4, 1924.

1,485,960

UNITED STATES PATENT OFFICE.

BYRON J. CHAPMAN, OF ST. LOUIS, MISSOURI.

METHOD OF AND APPARATUS FOR DETERMINING THE LOCATION OF THE PISTON WITHIN A CYLINDER OF AN INTERNAL-COMBUSTION ENGINE.

Application filed May 7, 1923. Serial No. 637,240.

*To all whom it may concern:*

Be it known that I, BYRON J. CHAPMAN, a citizen of the United States, residing at the city of St. Louis, in the State of Missouri, have invented certain new and useful improvements in methods of and apparatus for determining the location of the piston within a cylinder of an internal-combustion engine, of which the following is a specification.

This invention relates to a method of, and apparatus for, determining the position of a piston in a cylinder of an internal combustion engine, and, also, for determining the direction of its stroke when moving. It pertains, furthermore, to a means of locating the knock or noise that is caused by loose or impaired joints or connections within the engine. All these results may be attained by this invention without the tearing down or disassembling of the entire engine, as has heretofore been necessary.

Knowledge of the position of the piston is essential for the proper timing of the spark, and of the inlet and exhaust valves, and is, also, of material assistance in determining whether a knock is due to side-slap of the piston or to a loose joint elsewhere. Preparatory to burning out carbon, also, it must first be ascertained that the piston is at the top of its stroke.

The apparatus consists generally of a device adapted to be screwed into the spark-plug opening, and has both audible and visible means for indicating the position and direction of stroke of a piston, and means for moving the piston in testing for a knock.

In the accompanying drawings forming part of this specification, in which like numbers of reference denote like parts wherever they occur, Figure 1 is a longitudinal central section through the device and a cylinder to which it is connected;

Figure 2 is a transverse section of the device disconnected, taken on the line 2—2 of Figure 3; and Figure 3 is an elevation of the detached device.

A conventional internal-combustion-engine cylinder 1 is provided with the usual piston 2, having a wrist pin 3, pivoted in wrist pin bearing 4, and fixed to connecting rod 5, provided with the usual bearing 6 for the crank shaft 7. In the practice of this invention, the engine is brought to rest, the spark-plug removed from the cylinder, and a pump 8, comprising a tube 9 having externally screw-threaded ends 10 for the reception of internally screw-threaded caps 11 and 12, is secured to the cylinder by a stem 13 externally threaded at its lower end to fit the internally-threaded spark-plug opening 14, and externally-threaded at its upper end to fit the internally-threaded opening 15 of the lower cap 12. A handle 16 is secured to the upper end of piston rod 17, which passes through opening 18 in the upper cap 11, and has secured to its lower end by nuts 19 the piston 20. Piston 20 consists of cup-leathers 21 and metal washers 22 clamped between nuts 19 and the shoulder 23 of piston rod 17. Openings 24 in cap 11 permit the escape of fluid and thereby prevent variation of pressure in the cylinder space above piston 20.

In one side of the tube 9 at a short distance above the lower cap 12 is a small hole 25, which is concentric with a similar hole 26 in the apex of a conical shell 27, which has its base 28 secured by soldering to the side of the tube 9. This construction forms a whistle having the chamber or cavity 29.

The method of determining the position of a piston is as follows: The inlet and exhaust valves of the cylinder containing the piston under test should be in the closed position during the test. Both these valves are normally closed during the compression and explosion strokes of the piston. For this reason the test begins preferably with the compression stroke. The engine is turned over slowly by hand, and on the ascent of the piston during the compression stroke, the resulting compression of the air within the cylinder is communicated to the pump 8, causing the pump piston 20 to rise from the bottom of the pump 8 past the opening 25 in the whistle, with the result that the compressed air passes through the whistle and thereby causes it to blow. When the crank shaft 7 passes the top center there will be no compression of the air in the cylinder and consequently no whistle, the silence of the whistle therefore indicating that the top position or end of the compression stroke has been reached.

When this position of the engine has been thus determined, the spark timer may be set, and carbon may, also, be burned.

In continuing to turn over the engine slowly by hand, the piston 2 now enters on the explosion stroke, the descent of the piston 2 producing a vacuum or negative pressure in the cylinder 1, which causes air to pass from the atmosphere through the whistle and pump and into the cylinder 1, thereby again blowing the whistle, but with less volume, however, than on the compression stroke, since the degree of vacuum pressure, which can be reached is limited by the normal pressure of the atmosphere. The intensity or faintness of the whistle, therefore, indicates whether the piston 2 is ascending or descending, the whistle, of course, blowing loudest during either stroke when the piston 2 is at its middle point, since then the piston 2 is moving at its maximum speed, and consequently producing the maximum pressure or the maximum suction, as the case may be.

When the piston 2 has descended to the bottom of its stroke, the whistling desists, and that position has been thereby determined at which the exhaust valve may be set.

As the turning over of the engine is now continued, the piston 2 begins to ascend on the exhaust stroke, there being now no compression within the cylinder 1, because the exhaust valve is open and, therefore, no whistling, the pump piston 20 being in its lowest position. If, however, the exhaust valve has been improperly set, so that the valve closes before the piston 2 has reached its top position, the resulting slight compression within the cylinder 1 will be indicated by a slight movement of the pump handle 16.

In locating a knock, the proceedure is as follows: The piston 2 is brought to an intermediate position, preferably the middle position, as shown in broken-and-dotted lines in Figure 1, by noting at which point in the stroke the whistling is loudest. The finger is then placed over the whistle aperture 26, and the pump piston 20 reciprocated by reciprocating the handle 16, and thereby creating pulsations in the air within the cylinder 1, which pulsations are transmitted to the piston 2 and the loose connection, causing the knock to be heard.

The piston 2 is now brought to one of its end positions, preferably the top position, as shown in dotted lines in Figure 1, by noting the point at which the whistle becomes silent when slowly turning over the engine. When this position has been determined, the pump handle 16 is again reciprocated and noting whether or not the knock is again heard. If the knock is no longer present in this position of the piston 2, it has been due to side-slap of the piston 2 in the cylinder 1, because there is no side-slap in either the top or bottom positions of the piston, since there is no side force tending to wear the interior of the cylinder to an oval section at these points. However, in the middle part of the stroke, the cylinder wears more on the sides, because of the transverse component of the force transmitted through the connecting rod 5 when the rod 5 is at an angle to the axis of the piston, as shown in broken-and-dotted lines.

However, if the knock is still present, it is not due to side-slap, but is cause by looseness at the wrist pin 3 or the bearing 6. To finally locate the knock, the hand is placed on the starting crank and the pump handle 16 again reciprocated. If the loose joint then be at the wrist pin 3, the shock transmitted to the hand will be comparatively slight, but if at the bearing 6 it will be much greater, since the small inertia of only the piston results in the production of the shock in the first instance, while in the latter instance the combined inertia of the piston and connecting rod due to their acting as a single unit mass produces the shock.

Having thus described this invention, I hereby reserve the benefit of all changes in form, arrangement, order, or use of parts, as it is evident that many minor changes may be made therein without departing from the spirit of this invention or the scope of the following claims.

I claim:

1. An apparatus for determining the location of the piston within a cylinder of an internal combustion engine, comprising a device adapted to be mounted in the spark-plug opening of the cylinder and having both audible and visible means for indicating the position and direction of stroke of the said piston, the said visible means being operable, also, for creating pulsations in the air within the cylinder in testing for a knock.

2. An apparatus for determining the location of the piston within a cylinder of an internal combustion engine, comprising a pump and means for attaching same to the cylinder so that the interior of the pump is in communication with the interior of the cylinder, the said pump being provided with air-escape ports forming a whistle operating when the piston is moving in one direction of its stroke to sound with more or less intensity than when the said piston is moving in the opposite direction of its stroke.

In testimony whereof I hereunto affix my signature.

BYRON J. CHAPMAN.